United States Patent [19]

Komurasaki et al.

[11] 4,334,299
[45] Jun. 8, 1982

[54] OPTICAL SIGNAL RECORDING AND REPRODUCING SYSTEM

[75] Inventors: Satoshi Komurasaki; Isao Watanabe; Osamu Ito, all of Amagasaki, Japan

[73] Assignee: Mitsubishi Denki Kabushiki Kaisha, Tokyo, Japan

[21] Appl. No.: 87,302

[22] Filed: Oct. 22, 1979

[30] Foreign Application Priority Data

Oct. 24, 1978 [JP] Japan .............................. 53-131367

[51] Int. Cl.$^3$ .......................... G11B 7/00; G11B 7/12
[52] U.S. Cl. .................................... 369/44; 369/109; 369/110
[58] Field of Search ............... 179/100.1 G, 100.3 V, 179/100.4 C; 346/76 L, 108; 358/127–132; 250/202, 578; 369/44–46, 109–111

[56] References Cited

U.S. PATENT DOCUMENTS

| | | | |
|---|---|---|---|
| 3,474,457 | 10/1969 | Becker | 346/76 L |
| 3,510,658 | 5/1970 | Rabedeau | 250/578 |
| 3,651,281 | 3/1972 | Becker | 360/59 |
| 4,225,873 | 9/1980 | Winslow | 179/100.3 V |

Primary Examiner—Raymond F. Cardillo, Jr.
Attorney, Agent, or Firm—Wenderoth, Lind & Ponack

[57] ABSTRACT

A recording optical system forms a recording spot to record a pitted signal on a record surface. A first reproducing optical system forms a reproducing spot fixed with respect to the recording spot on the record surface for monitoring purposes, and a second reproducing optical system with the greater part of the optical components thereof common to the first reproducing optical system and also including a rotatable reflecting mirror for forming a tracking spot on the record surface. The tracking spot is movable on the recorded signal by the rotation of the mirror in response to the light reflected from the record surface for causing the tracking spot to accurately track the pitted signal on the record surface.

9 Claims, 16 Drawing Figures

OPTICAL SIGNAL RECORDING AND REPRODUCING SYSTEM

BACKGROUND OF THE INVENTION

This invention relates to an optical signal recording and reproducing system for video discs and the like, and more particularly to such a system for reproducing correctly recorded signals not only during the recording but also after the recording.

In recent years, there have been developed record media of the type including a film of a metal such as bismuth, gold, chromium or the like attached on a substrate and capable of recording signals in the form of pits in the metal film by selectively melting or vaporizing the metal film.

Record media of the type referred to eliminates the necessity of effecting the development of latent images required for photoresist recording employed heretofore and has the advantage that recorded signals can be reproduced immediately after their recording. By putting this advantage to practical use, the recorded characteristics can be immediately observed after the recording to maintain the recorded characteristics good thereby to achieve good recording. This immediate observation means is called a "real time monitor" which is well known in the art and may be abbreviated to "RTM".

In conventional optical signal recording and reproducing systems having the function of the RTM, recording laser light from the recording light source has been modulated with a signal to be recorded and converted to a recording light beam having a suitable cross sectional profile after which the light beam is straightforwardly passed through a beam splitter and collected into a recording spot on a recording metal film such as described above by a collecting lens to form a record pit thereon. Simultaneously the linearly polarized reproducing laser light from the reproducing light source is straightforwardly passed through a monitoring polarized beam splitter and converted to a reproducing light beam having a suitable cross sectional profile after which the light beam is circularly or elliptically polarized by a quarter-wave plate and collected into a reproducing spot on the recording metallic film by the same lens as the recording light beam after its optical path has been turned by the abovementioned beam splitter. Since the recording metal film is being moved at a predetermined speed in a predetermined direction, the reproducing spot is arranged to be located in the front of the recording spot in the direction of movement of the metal and on an imaginary record track with a predetermined constant spacing between the recording and reproducing spots. In other words, the reproducing spot is temporarily delayed with respect to the recording spot but immediately reproduces a recorded signal due to the latter spot.

The reproducing light beam including the recorded signal is, as a reflected light beam, reflected from the recording metal film and moved reversely on its optical path on which the reproducing light beam has advanced to reach the metal film. As the light beam has passed forward and backward through the quarter-wave plate, the reflected light beam is linearly polarized but has a polarization plane different from that of the original laser light by an angle of 90 degrees. Therefore after having reached the monitoring polarized beam splitter, the reflected light beam advances on its optical path after having been turned through an angle of 90 degrees by the beam splitter to fall on an associated monitoring system.

Accordingly, the recorded signal can be reproduced immediately after its recording resulting in the advantages that the recorded characteristics can undergo immediate observation so as to be maintained good and therefore at good quality recorded discs can be manufactured.

However, the reproducing spot is located at a position which is fixed with respect to the recording spot so as to be stably disposed on an associated record track so that a recorded signal is satisfactorily reproduced only when the reproducing is effected simultaneously with the recording. On the other hand, playing-back previously recorded discs has been difficult in that the reproducing spots can not be stably located on the record track.

Accordingly, it is an object of the present invention to provide a new and improved optical signal recording and reproducing system for not only observing the recorded characteristics immediately during the recording to maintain the recorded characteristics at good quality but also for reproducing correctly a recorded signal which has been recorded previously.

SUMMARY OF THE INVENTION

The present invention provides an optical signal recording and reproducing system comprising a moving record medium recording optical system for irradiating the record surface member with a recording light beam consisting of laser light to form a recording spot on the record surface member to record a signal thereon, and a reproducing optical system for irradiating the record surface member with a reproducing light beam consisting also of laser light to selectively form a first reproducing spot at a position fixed with respect to the recording spot on the record medium to reproduce the recorded signal, and a second reproducing spot at a position variable within a predetermined range with respect to the recording spot on the record medium.

Preferably, the reproducing optical system may include a portion composed of a pair of optical subsystems branched from each other through a selected polarized beam splitter on a half-silvered plate and connected to each other by a polarized beam splitter, a half-silvered plate on a reflection mirror so that the optical subsystems can be arranged in parallel relationship.

Also the reproducing optical system may include a half-wave plate removably inserted thereinto and the insertion and removal of the half-wave plate forms a first optical subsystem for forming the first reproducing spot, and a second optical subsystem for forming the second reproducing spot by the switching-over.

For tracking purposes, the second optical subsystem may include at least one reflecting mirror controllably rotatable in either of the opposite directions about an axis of rotation.

BRIEF DESCRIPTION OF THE DRAWINGS

The present invention will become more readily apparent from the following detailed description taken in conjunction with the accompanying drawings in which.

Throughout the Figures like reference numerals designate identical or corresponding components.

DESCRIPTION OF THE PREFERRED EMBODIMENTS

Figure 1:
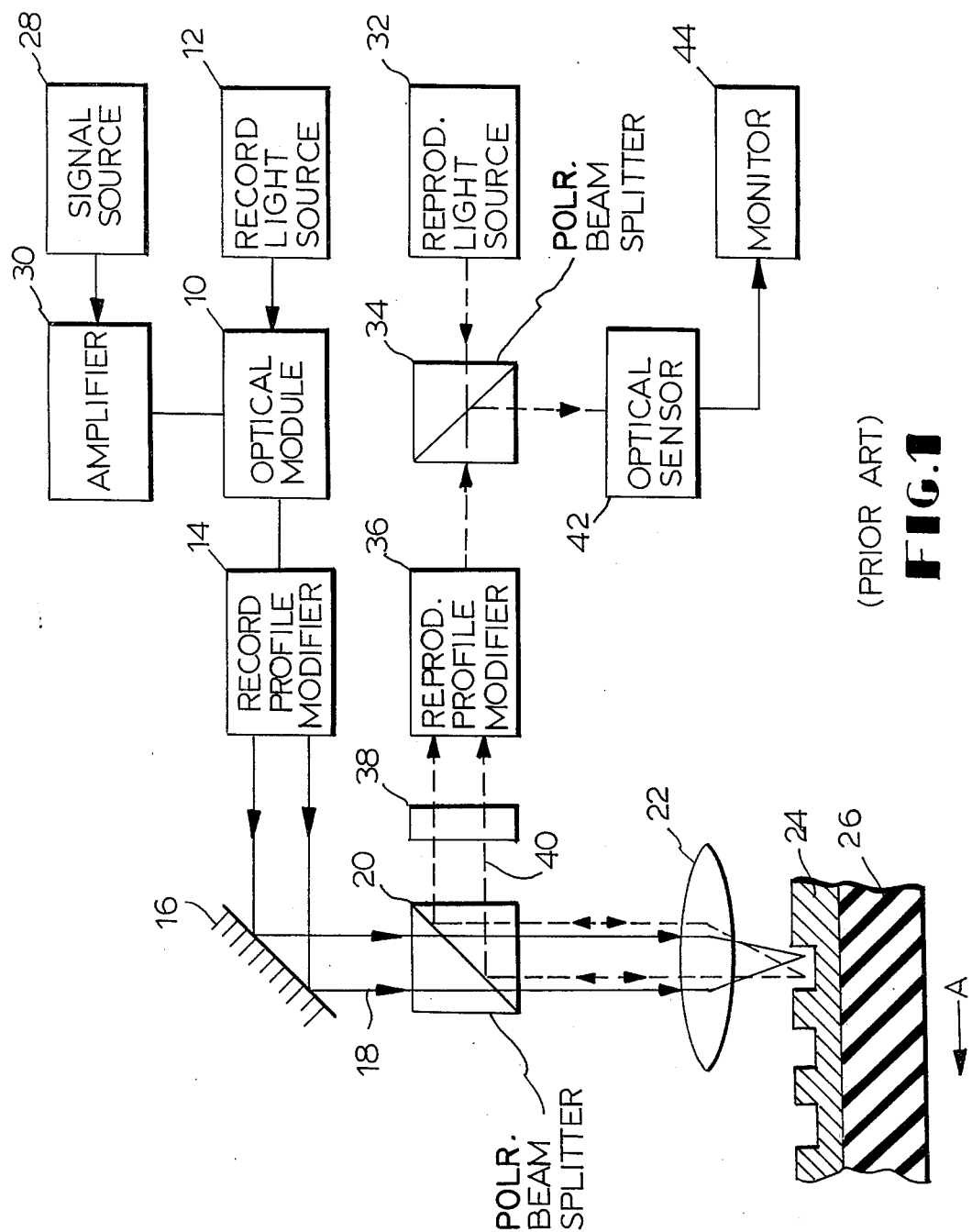
FIG. 1 is a block diagram of a conventional optical signal recording and reproducing system including a real time monitor with parts illustrated in section.

Referring now to FIG. 1 of the drawings, there is illustrated a conventional optical signal recording and reproducing system performing the function of real time monitoring well known in the art. The arrangement illustrated comprises a recording light source 10 for emitting recording light formed of laser light, an optical modulator 12 for amplitude modulating the recording light with a recorded signal, a recording profile modifier 14 for converting the modulated recording light to a recording light beam having a suitable cross sectional profile, and a reflecting mirror 16 for turning the optical path of the reproducing light beam from the recording profile modifier 14 through an angle of substantially 90 degrees to direct the recording light beam 18 reflected from the mirror 16 toward a polarized beam splitter 20. The recording light beam 18 is passed straightforwardly through the polarized beam splitter 20 and collected on a record surface 24 by a collecting lens 22. Therefore the record surface 24 is irradiated with the collected recording light beam 18.

The profile modifier 14 may comprise, for example, a beam expander and the record surface 24 is formed of a film of a metal such as bismuth, gold, chromium or the like attached to the surface of a substrate 26. The collected recording light beam irradiates a portion of the metallic film to melt or vaporize it with thermal energy due to that light beam thereby to form a bit thereon resulting in the recording of the signal.

As shown in FIG. 1, a signal source 28 generates the recorded signal and an amplifier 30 amplifies the recorded signal and supplies the amplified signal to the optical modulator 12 where the signal modulates the amplitude of the recording light from the recording light source 10 as described above.

The arrangement further comprises a reproducing light source 32 for emitting reproducing light formed of a linearly polarized laser light, a polarized beam splitter 34 permitting the reproducing light to pass therethrough straightforwardly, and a reproducing profile modifier 36 for converting the reproducing light leaving the beam splitter 34 to a reproducing light beam having a suitable cross sectional profile. The reproducing light beam falls upon a quarter-wave plate 38 where the recording light beam formed of the linearly polarized laser light is circularly or elliptically polarized. The reproducing light beam 40 thus polarized enters the polarized beam splitter 20 where the optical path thereof is turned through angle of substantially 90 degrees. Then the collecting lens 26 also collects the reproducing light beam 40 on the record surface 24. Thus the record surface 24 is also irradiated with the collected reproducing light beam 40.

Figure 2:
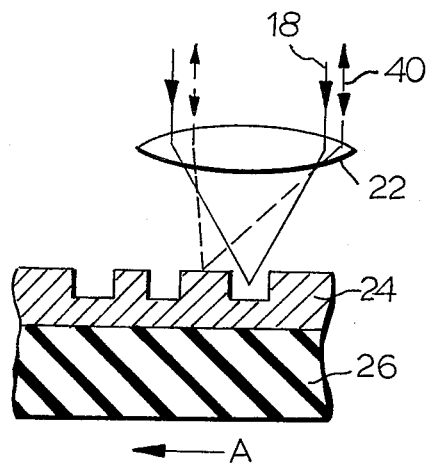
FIG. 2 is a fragmental sectional view, on an enlarged scale of the collecting lens and the record medium as shown in FIG. 1 with the recording and reproducing light beams as shown also in FIG. 1 collected on the surface of the record medium.

As best shown in FIG. 2, a predetermined distance is maintained between the position where the reproducing light beam 40 is collected or focussed on the record surface 24 and the position where the recording light beam 18 is collected or focussed thereon. This is because the optical paths of the light beams 18 and 40 have a predetermined space therebetween.

Figure 3:
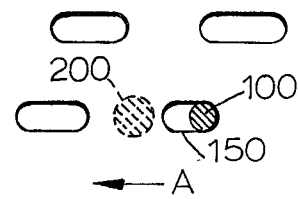
FIG. 3 is a fragmental plan view of optical spots formed on the record medium shown in FIGS. 1 and 2 by the arrangement shown in FIG. 1 with an array of recorded pits formed on the record medium.

As the substrate 26 is moved at a predetermined constant speed from the right to the left or in the direction of the arrow A shown in FIGS. 1, 2 and 3, the reproducing light beam 40 is collected to the left of the collected recording light beam 18 on the record surface 24.

As shown in FIG. 3, the recording light beam 18 forms a recording spot designated by a hatched circle 100 and therefore a recorded pit designated by a prolate circle 150 on the record surface 24. On the other hand, the reproducing light beam 40 is collected to form a reproducing spot designated by a hatched circle 200 on the record surface 24. The recording spot 100 usually has a dimension of 1 micron or less and, as shown in FIG. 3, the reproducing spot 200 is located on an imaginary record track connecting the recorded pits 150 and to the left of the recording spot 100 with a predetermined space therebetween as described above. In other words, the reproducing spot 200 is disposed at a position temporarily delayed with respect to that of the recording spot 100. However, the reproducing spot 200 immediately reproduces the signal recorded in the pit 150 on the record surface.

The reproducing spot 200 including the reproduced signal is reflected from the record surface 24 to form a reflected light beam also designated by the reference numeral 40. The reflected light beam 40 passes reversely along the optical path on which the reproducing light beam 40 has advanced from the polarized beam splitter 34 to the record surface 24 until it reaches the polarized beam splitter 34 which may be called hereinafter a first polarized beam splitter only for purposes of illustration. Since the reflected light beam 40 is circularly or elliptically polarized, the same is linearly polarized after having passed through the quarter-wave plate 38 but the polarizing plane thereof is different from that of reproducing light from the second light source 32 by an angle of 90 degrees. Therefore the first polarized beam splitter 34 turns the optical path of the reflected light beam 40 through an angle of substantially 90 degrees to direct the light beam 40 toward an optical sensor 42.

Then an output from the optical sensor 42 is applied to a reproducing monitor 44 where it is processed to attain the particular purpose. For example, assuming that the signal source 28 comprises a source of a television signal, the monitor 44 is formed of a demodulator circuit for the television signal, a monitoring television receiver etc. If desired, a vector scope may be substituted for the television receiver.

Alternatively, assuming that the signal source 28 generates a pulse code modulated audio signal, the monitor 44 can be formed of an audio signal demodulation circuit, a power amplifier a loudspeaker etc. If desired, the monitor 44 may include a counter for counting the number of bit errors. By judging the quality of monitored images or reproduced audio signal as the case may be and feeding the result of the judgement back to the recording unit, for example, by adjusting a bias applied to the optical modulator 12, the recorded characteristics can be maintained at a good quality.

From the foregoing it is seen that conventional real time monitors can be used to reproduce signals immediately after their recording. Accordingly, conventional optical signal recording and reproducing systems such as shown in FIG. 1 have been advantageous in that the recorded characteristics can be observed immediately after the recording thereby to maintain the recorded characteristics so that they are of good quality permitting the manufacturing of good recorded discs.

However, the reproducing spot is located at a position fixed with respect to that of the recording spot as described above. Therefore only when the reproducing is effected simultaneously with the recording is the reproducing spot stably located on an associated record track to reproduce a recorded signal. However, when playing back a previously recorded disc, there has been the disadvantage that the reproducing spot can not be stably located on the record tract. For example, a video disc includes a spiral-shaped record track disposed on the surface thereof because the recording of the signal is accomplished by forming the recording spot on the surface of discs being rotated at a constant speed while the reproducing spot undergoes a radial constant feed. After the recording, a reproducing spot may be formed on the record surface by subjecting the record track formed during the recording to a radial constant feed similar to that effected during the recording. This results only in the reproducing spot crossing the record track independently of the spiral of the record track. Therefore the signal can not be stably reproduced.

As well known, this results in the necessity of effecting tracking control which causes the reproducing spot to stably track the record track in the reproducing systems.

Figure 4:
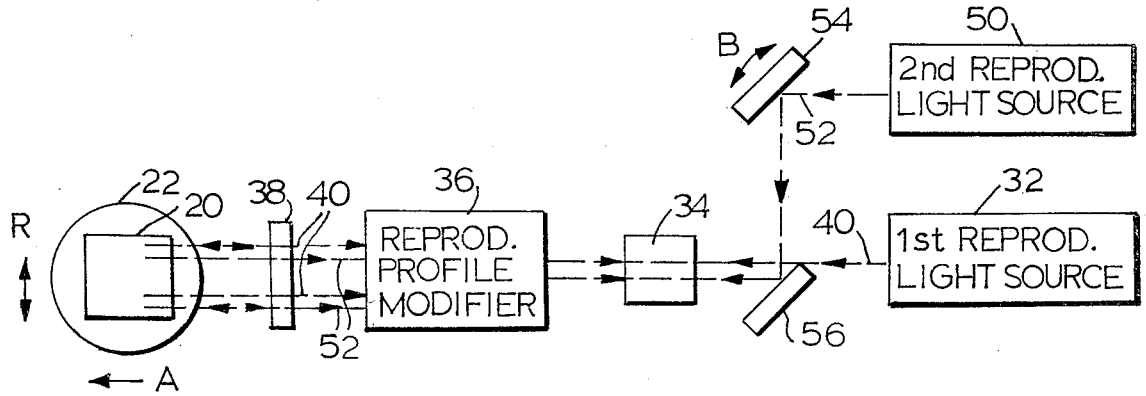
FIG. 4 is a block diagram of one embodiment according to the optical signal recording and reproducing system of the present invention with parts illustrated in plan and with the optical signal recording unit thereof omitted.

Referring now to FIG. 4, there is illustrated one embodiment according to the optical signal recording and reproducing system of the present invention. The present invention may comprise any conventional recording optical system such as described above in conjunction with FIG. 1. In FIG. 4, therefore, there is shown only the reproducing optical system of the present invention while a recording optical system for a recording light beam used with the present invention is omitted. More specifically, the recording light source 10, the optical modulator 12, the recording profile modifier 14 and the reflecting mirror 16 as shown in FIG. 1 are omitted along with the signal source 28 and the modulation amplifier 30. Also, in FIG. 4, the polarized beam splitter 20 and the collecting lens 22 are shown as being viewed from the top of FIG. 1.

The arrangement illustrated comprises the first reproducing light source 32, the first polarized beam splitter 34, the reproducing profile modifier 36, the quarter-wave plate 38, the polarized beam splitter 20 and collecting lens 32 to collect the recording light beam 40 formed of the linearly polarized laser light from the first light source 32 on the record surface 24 (not shown) in the same manner as described above in conjunction with FIG. 1.

The arrangement further comprises a second reproducing light source 50 for emitting linearly polarized laser light forming a second reproducing light beam 52 and a second reflecting mirror 54 for turning the optical path of the second reproducing light beam 52 through an angle of substantially 90 degrees to direct the light beam 52 toward a third reflecting mirror 56. The third reflecting mirror 56 is disposed not to intercept the first light beam 40 from the first light source 32 and turns the optical path of the second reproducing light beam 52 reflected from the second reflecting mirror 54 through an angle of substantially 90 degrees to cause the light beam 52 reflected therefrom to be normally substantially parallel to the first reproducing light beam 40. Then the second reproducing light beam 52 enters the first polarized beam splitter 34 and is collected on the record surface 24 (not shown in FIG. 4) in the same manner as the first reproducing light beam 40.

The second reflecting mirror 54 can be controllably turned in either of the opposite directions about its axis of rotation perpendicular to the plane of FIG. 4 and within a predetermined maximum angle as shown by the doubleheaded arrow B in FIG. 4.

Figure 5:
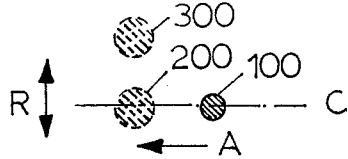
FIG. 5 is a fragmental plan view of optical spots formed on the record medium by the arrangement shown in FIG. 4.

As in the arrangement of FIG. 1, the first and second reproducing light beams 40 and 52 are collected into a first and a second reproducing spot 200 and 300 respectively on the record surface as shown in FIG. 5. As in the arrangement of FIG. 1, the first reproducing spot 200 lies on an imaginary record track labelled C in FIG. 5 with the recording spot 100 formed on the recorded surface in the manner as described above in conjunction with FIGS. 1, 2 and 3. On the other hand, the second reproducing spot 300 is located at a position which, relative to the first reproducing spot 200 appears to be displaced on the record surface radially of the spot 200 or in the direction of the double headed arrow R.

Each of the first and second light beams 40 and 52 originating from the first and second reproducing spots 200 or 300 and reflected from the track surface moves reversely on the optical path on which the first and second producing light beams 40 and 52 have respectively advanced from the first polarized beam splitter 34 to the record surface 24 until they reaches the first polarized beam splitter 34. Since the light beams 40 and 52 have been initially linearly polarized and have passed forwards and backwards through the quarter-wave plate 38, the reflected light beams 40 and 52 which have reached the first polarized beam splitter 34 are linearly polarized and in a different polarizing plane from the original light beams 40 and 52 by an angle of 90 degrees. Therefore the first polarized beam splitter 34 turns the optical path of each reflected light beam 40 and 52 through an angle of substantially 90 degrees. In other words, the reflected light beams 40 and 52 are turned to advance in a direction perpendicular to the plane of FIG. 4 and directed from the front to the back thereof and toward a reproducing and monitoring system as shown in FIG. 6.

The first reflected light beam 40 from the first polarized beam splitter 34 falls on a first optical sensor 42 subsequently connected to a monitor 44. The optical sensor 42 and the monitor 44 may be identical to those shown in FIG. 1. Therefore the first optical sensor 42 and the monitor 44 process the first reflected light beams 40 in the same manner as described above in conjunction with FIG. 1 for monitoring purposes.

Figure 6:
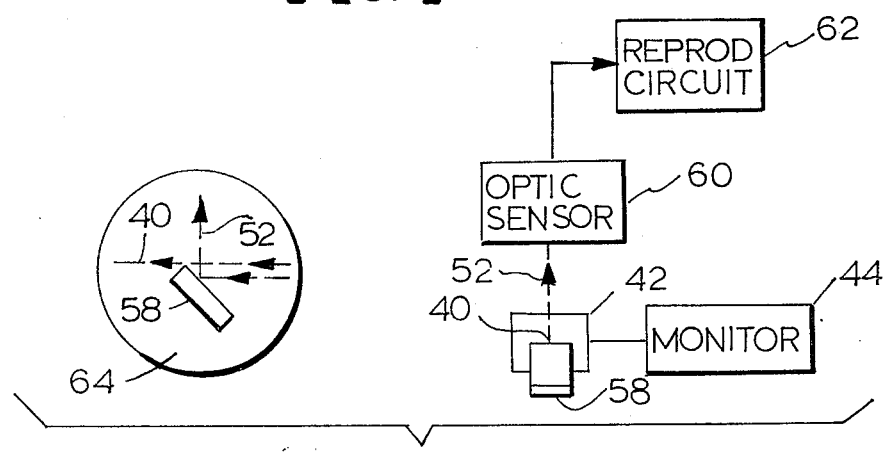
FIG. 6 is a block diagram of a sensing reproducing system which may be connected to the arrangement shown in FIG. 4.

On the other hand, the second reflected light beam 52 from the first polarized beam splitter 34 falls on a fourth reflecting mirror 58 disposed to turn the optical path of a light beam incident thereon through an angle of substantially 90 degrees but not to intercept the first reflected light beam 40 as best shown in a circle in the lefthand portion of FIG. 6 and designated by the reference numeral 64. In this case, the fourth reflecting mirror 58 turns the second reflected light beam 52 to advance it from the bottom to the top as viewed in FIG. 6. Then the light beam 52 falls on a second optical sensor 60 to be converted to a corresponding electrical signal. The electrical signal is applied to a reproducing circuit 62 where it is reproduced into a tracking signal for controlling the tracking of the record track.

In this way, the pair of reproducing light beams have irradiated the record surface and a pair of associated light beams reflected from the record surface have been sensed.

One example of the tracking control employing the second reproducing spot 300 will now be described in conjunction with FIGS. 7a through 7d. In those Figures there are illustrated the principles that a single light beam, in this case, the second reproducing light beam 52 generates the reproducing and tracking signals and a beam of convergent light 32 from the collecting lens 22 incident upon the record surface 24 is reflected therefrom and focussed in a focussing plane (not shown) by the collecting lens 22 as shown by a beam of convergent light 52. In the example illustrated the reflected light beam 52 reaches a light bearing surface on the optical sensor 60. As in the arrangements shown FIGS. 1, 2 or 4, the collecting lens 22 has its optical axis orthogonal to the record surface 24 which is, in turn, illustrated in a section taken along a line crossing one of the recorded pits 150 (see FIG. 3) except for FIG. 7a.

Figure 7A:
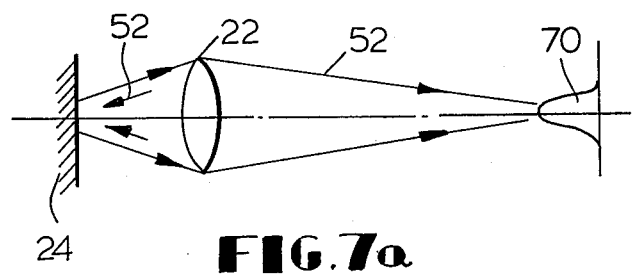
FIGS. 7a, 7b, 7c and 7d are schematic diagrams useful in explaining the principles of tracking and signal reproduction utilized in the present invention.

It is assumed that, as shown in FIG. 7a, the beam of convergent light 52 falls on a portion of the record surface 24 including no pit indicating one of the prolate circles (see FIG. 3) along the imaginary record track C (see FIG. 5). Under these assumed conditions, the reflected light beam 52 passing through the collecting lens 22 has an intensity profile 70 including a single maximum as shown in FIG. 7a.

Figure 7B:
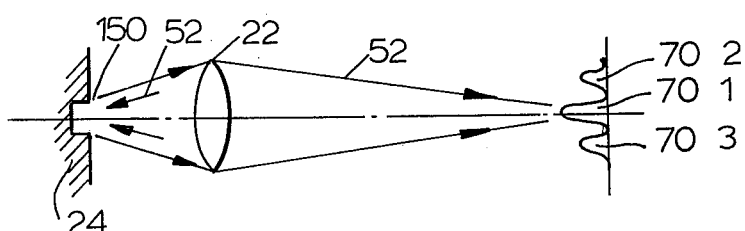

FIG. 7b shows the collecting lens 22 centered on one pit 150 on the record surface 24. That is, the collecting lens 22 has its optical axis passing through the center line of the pit 150. The resulting intensity profile or diffraction pattern includes the principal maximum 70-1 on the optical axis of the collecting lens 22 and a pair of secondary maxima 70-2 and 70-3 smaller than the principal maximum 70-1 and symmetrically disposed on both sides of the latter. The secondary maxima are equal in magnitude to each other. The principal maximum 70-1 results from a beam of diffracted light with the zero order reflected from the record surface 24 and the secondary maxima 70-2 and 70-3 result from a pair of beams of diffracted light with the plus and minus first orders reflected from the record surface 24.

Figure 7C:
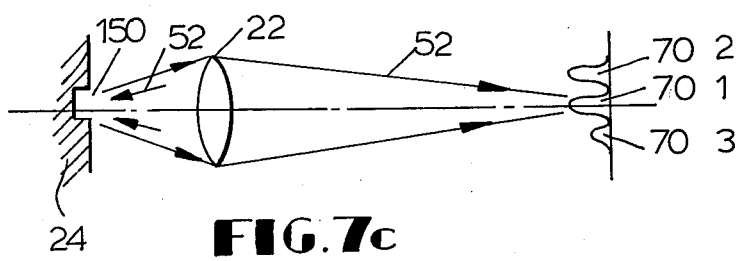

FIG. 7c shows the collecting lens 22 off center relative to the pit 150. In this case, the optical axis of the collecting lens 22 deviates from the central line of the pits in a downward direction as viewed in FIG. 7c. The resulting diffraction pattern is not symmetric with respect to the optical axis of the collecting lens 22 so that secondary maximum 70-2 has the largest magnitude and is located on that side of the optical lens 22 axis opposite to the side thereof nearest to the wall of the pit 150. The other secondary maximum 70-3 has the smallest magnitude.

Figure 7D:
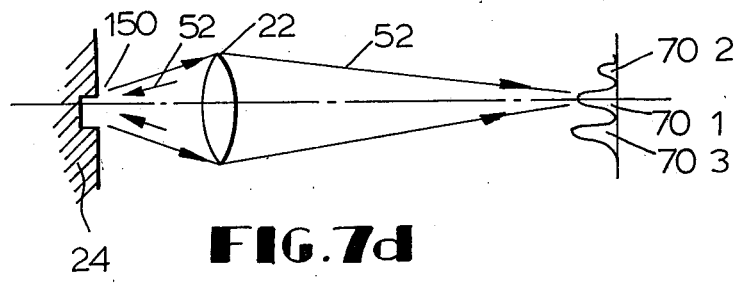

FIG. 7d shows the collecting lens 22 off center relative to the pit 150 in a direction opposite to that illustrated in FIG. 7c. Thus the resulting diffraction pattern 70 is reversed from that shown in FIG. 7c.

The intensity profiles or diffraction patterns as shown in FIGS. 7a through 7d have been confirmed by both the theory of diffraction and experiments. It has been found that, by making the diameter of the beam of convergent light 52, in this case, the second reproducing light beam 52, on the record surface 24 equal to two or three times the width of the pit 150, one of the secondary maxima will have a sufficiently large magnitude exceeding, for example, 60% of the magnitude of the principal maximum.

By differentially sensing the secondary maxima 70-2 and 70-3, a tracking signal can be generated. On the other hand, the reproduced signal can be produced by sensing the primary maximum 70-1, either one of the secondary maxima 70-2 or 70-3, or all the primary and secondary maxima 70-1, 70-2 and 70-3.

More specifically, the tracking control can be accomplished by providing three light bearing surfaces on the second optical sensor 60 shown in FIG. 6 so as to permit the primary maximum 70-1 and the secondary maxima 70-2 and 70-3 to fall on those three light bearing surfaces respectively. Then the subtraction of the sensed secondary maxima 70-2 and 70-3 gives a difference signal which is, in turn, utilized to displace the second reproducing spot 300 to center the recorded pit 150. To this end, the difference signal may be amplified and then drive a moving coil type galvanometer (not shown) and the third reflecting mirror 54 shown in FIG. 4 is connected to the rotary shaft of the galvanometer. Under these circumstances, the difference signal is used to rotate the third mirror 54 in either of the opposite directions as shown by the double headed arrow B in FIG. 4 through the galvonmeter until the second reproducing spot 300 is put on one of the bits 150 on the imaginary record track C (see FIG. 5) whereupon the tracking is completed. Thereafter the second reproducing spot 300 can be used to play back the signal recorded on the record surface 24.

That is, the second reproducing spot 300 takes over the duty of the first reproducing spot 200.

Figure 8:
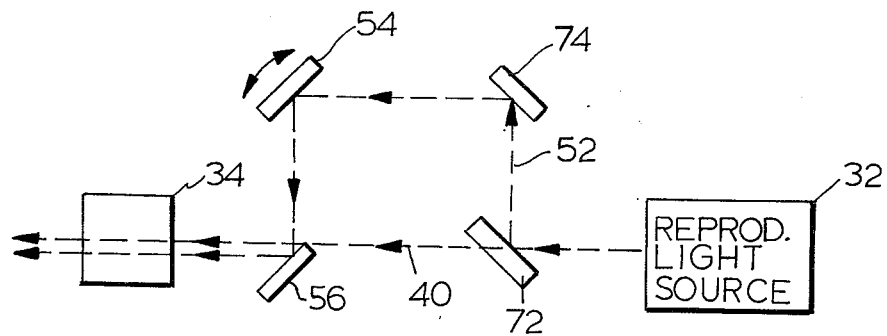
FIGS. 8 through 12 are fragmental block diagrams of different modifications of the present invention with the optical signal recording unit thereof also omitted.

The arrangement illustrated in FIG. 8 includes the signal reproducing light source shown in FIG. 4 as being the first reproducing light source 32 illustrated in FIG. 4 and therefore designated also by the same reference numeral 32. A light beam from the light source 32 is split in a pair of light beams 40 and 52 by a half-silvered plate 72. One of the split light beams, in this case, the light beam 40 advances straightforwardly to enter the first polarized beam splitter 34. The other light beam 52 goes on its optical path substantially perpendicular to that of the light beam 40 to fall on a fifth reflecting mirror 74. The fifth mirror 74 turns the optical path of the light beam 54 through an angle of substantially 90 degrees so that the light beam 54 is incident upon the surface of the rotatable reflecting mirror 54.

In other respects, the arrangement is identical to that shown in FIG. 4.

In the arrangement of FIG. 8, the fifth mirror 74 may be controllably rotatable in the same manner as the third mirror 54 so that the latter can be maintained stationary.

Figure 9:
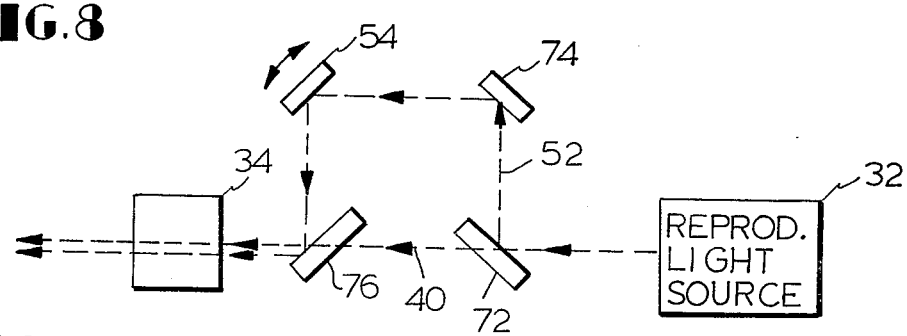

The arrangement illustrated in FIG. 9 is different from that shown in FIG. 8 only in that in FIG. 9 a half-silvered plate 76 is substituted for the reflecting mirror 36 shown in FIG. 8. Therefore, the half-silvered plate 76 permits the first light beam 40 to pass straightforwardly therethrough and turns the second light beam 52 to be normally parallel to the first light beam 40 with the result that the spacing between the light beams 40 and 52 can be small. Alternatively, one of the light beams 40 and 52 may be locally overlapped on the other. This results in a narrow space between the first and second reproducing spots 200 and 300 respectively.

Figure 10:
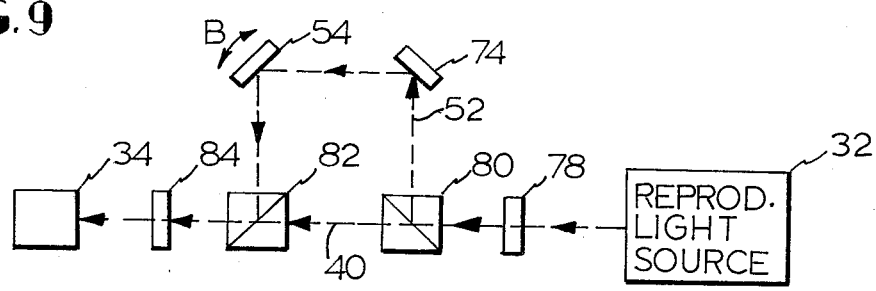

FIG. 10 shows a reproducing optical system switching from an optical system with the first reproducing light beam 40 to that with the second reproducing light beam 52 and vice versa. The arrangement illustrated is different from that shown in FIG. 9 principally in that in FIG. 10 a pair of half-wave plates are removably disposed between the light source 32 and the first polarized beam splitter 34. The reproducing light source 32, a first half-wave plate 78, a second polarized beam splitter 80, a third polarized beam splitter 82 and a second half-wave plate 84 are disposed at predetermined intervals in the named order on the common optical axis. The polarized beam splitters 80 and 82 are located at the positions of the half-silvered plates 72 and 76 respectively as shown in FIG. 9.

In other respects, the arrangement is identical to that shown in FIG. 9.

When the arrangement of FIG. 10 is operated to form the first reproducing spot 200 on the record surface of the first reproducing light beam 40 to perform the function of a real time monitor to monitor the recorded status during the recording, the first and second half-wave plates 78 and 84 respectively are removed from the arrangement. This results in an optical system equivalent to that shown in FIG. 9. Under these circumstances, the light beam emitted from the light source 32 has a polarizing plane permitting the same to pass straightforwardly through the second polarized beam splitter 80. That polarizing plane is parallel to the plane of FIG. 10. Therefore the light beam 40 leaving the second polarized beam splitter 80 passes straightforwardly through the third polarized beam splitter 82 until it falls on the first polarized beam splitter 34. Thereafter the light beam 40 reaches the record surface as described above in conjunction with FIGS. 1 and 4 resulting in the formation of the first reproducing spot 200 thereon.

However, when the second reproducing spot 300 is formed on the record surface of the second reproducing light beam 52 performing the tracking operation, the first and second half-wave plates 78 and 84 are disposed at their positions as shown in FIG. 10. Under these circumstances, the light beam from the reproducing light source 32 passes through the first half-wave plate 78 where the polarizing plane thereof is rotated through an angle of 90 degrees. This prevents the light beam leaving the half-wave plate 78 from passing straightforwardly through the second polarized beam splitter 80 but permits that light beam to be turned to go on its optical path substantially perpendicular to that of the first light beam 40 until the light beam 52 falls on the fifth reflecting mirror 74. The mirrors 74 and 54 successively turn the optical path of the second light beam 52 through angles of substantially 90 degrees and then the third polarized beam splitter 82 further turns the optical path of the light beam 52 through an angle of substantially 90 degrees to cause the latter to advance on the same optical path as the first light beam 40. Since the second light beam 52 leaving the third polarized beam splitter 82 has its polarizing plane different from that of the first light beam 40 by an angle of 90 degrees, the same undergoes the rotation of its polarizing plane through 90 degrees in the second half-wave plate 84 resulting in the polarizing plane thereof returning to the original one. Then the second light beam 52 enters the first polarized beam splitter 34 after which it forms the second reproducing spot 300 (see FIG. 5) on the record surface as described above in conjunction with FIG. 4.

The resulting second reproducing spot 300 has a position which is variable in accordance with the accuracy with which the first and second half-wave plates 78 and 84 are located at their predetermined positions respectively. A variation in spot's position is controlled to an extent that no problem is offered by considering the thickness and refractive index of the two half-wave plates and also quite out of question in view of the performance of the tracking function. Also as only either the first or second reproducing spot is always formed on the record surface, only one optical sensor is required. Further the second reproducing light beam 52 passes through the collecting lens 22 adjacent to the center resulting in the formation of reproducing spots having less distortion.

Figure 11:
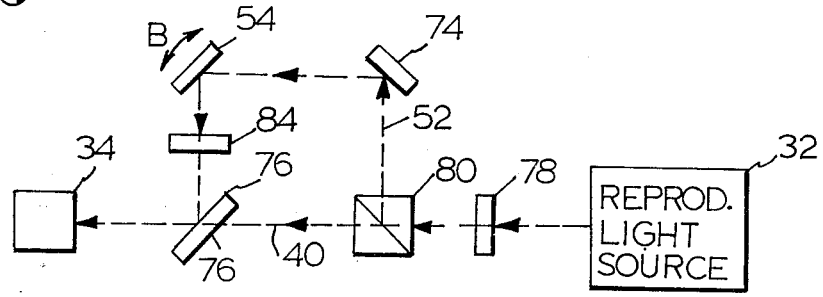

The arrangement illustrated in FIG. 11 is different from that shown in FIG. 10 only in that in FIG. 11, the second half-silvered plate 76 is substituted for the third polarized beam splitter 82 and the second half-wave plate 84 is disposed between the third reflecting mirror 54 and the second half-wave plate 76 but not between the latter and the first polarized beam splitter 34.

In the arrangement illustrated the second light beam 52 reflected from the third reflecting mirror is first passed through the second half-wave plate 84 to be returned to the original polarizing plane and then turned by the third reflecting mirror 54 to be directed toward the first polarized beam splitter 34.

The arrangement of FIG. 11 is operative as an optical system for forming the first reproducing spot on the record surface in the absence of the first half-wave plate 78 and as an optical system for forming the second reproducing spot on the record surface in the presence of the first half-wave plate 78.

Figure 12:
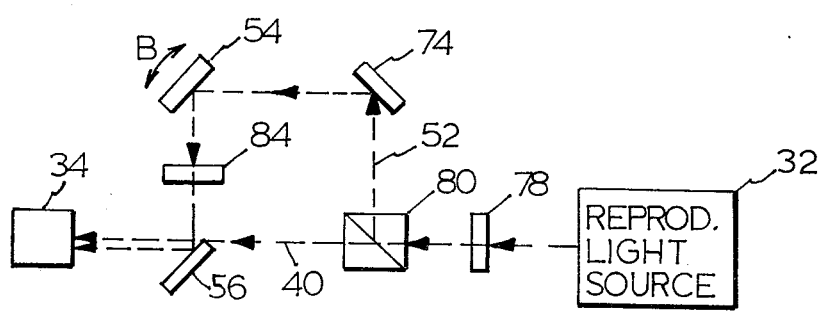

The arrangement illustrated in FIG. 12 is different from that shown in FIG. 11 only in that in FIG. 12 the second reflecting mirror 36 is substituted for the second half-silvered mirror 82 shown in FIG. 11. As in the arrangement of FIG. 4, the second reflecting mirror 36 is located at such a position that the first light beam 40 does not enter into the same. The spacing between the centers of the first and second reproducing spots is large as compared with the arrangements shown in FIGS. 10 and 11. However, the efficiency of utilization of the reproducing light beam is higher than that obtained by the use of the half-silvered mirror.

It is seen that, during the recording, the second reproducing light beam is not required to reproduce the recorded signal because the first reproducing light beam is operative to reproduce the recorded signal. Also, after the recording, the second reproducing light beam serves to reproduce the recorded signal but the latter can not be stably reproduced because the first reproducing light beam is a fixed light. As a result, the first and second reproducing light beams are not required to be used simultaneously.

For purposes of simplification, the measure of using a single reproducing optical path may be considered. For example, in the arrangement of FIG. 12, the second reflecting mirror 54 may be fixed during the recording by the application of a DC signal to an associated drive means, although the mirror 54 performs the tracking operation during the reproducing effected after the recording. This permits the use of the single reproducing optical path. However if the third reflecting mirror 54 must be fixed during the recording as described above then it is difficult to ensure that the mirror 54 is fixed. Also it is difficult to locate the second reproducing spot 200 having normally a dimension of from 1 to 2 microns at its predetermined position fixed with respect to the recording spot 100, that is to say, at its position where the recorded signal is correctly reproduced. This makes it impossible to precisely monitor the recorded status.

In the foregoing respects, the present invention is quite out of question.

From the foregoing it is seen that the present invention provides an optical signal recording and reproducing system for forming a recording spot, a first reproducing spot at a position fixed with respect to the recording spot or a second reproducing spot which has a variable position within a predetermined range with respect to the recording spot on a record surface. Therefore, during the recording the first reproducing spot fixed with respect to the recording spot can be used to reproduce a recorded signal immediately after its recording, thereby to monitor the recorded status. Consequently, the recorded characteristics can be maintained at a high level resulting in the manufacturing of good recorded discs. Also, during playing-back, the recorded signal can be stably reproduced because the second reproducing spot is operative to track the record track. Further in the arrangements shown in FIGS. 10 and 11 a single optical sensor may be provided. This permits a reduction in cost. Also a reproducing system or an associated monitoring system can be composed of components the number of which is reduced as compared to conventional systems. In addition, the reproducing light beam passes through the collecting lens adjacent to the center and therefore the distortion of the reproducing spot will be decreased.

While the present invention has been illustrated and described in conjunction with several preferred embodiments thereof it is to be understood that numerous changes and modifications may be resorted to without departing from the spirit and scope of the present invention.

What we claim is:

1. An optical signal recording and reproducing device for recording information on and reproducing information from a recording surface of a recording medium moving at a constant speed and direction with respect to said device, said device comprising:
a recording light source means for producing a recording laser light;
signal generator means for generating signal representing information to be stored;
modifier means connected to said first light source means for receiving the recording laser light and to said signal generator means for modifying said recording laser light in response to said signal;
first optical path means for directing and focusing the modified recording laser light on said moving recording surface at a recording spot which is fixed with respect to said device for forming a recording pattern along a recording track on said recording surface;
a reproducing light source means, including means for producing a first reproducing laser light directed in a fixed direction with respect to said device;
second reproducing laser light producing means for producing a second reproducing laser light and for varying the direction of said second reproducing laser light with respect to said device;
second optical path means for receiving said first and second reproducing laser light and directing and focusing said first reproducing laser light along said track on said recording surface at a first reproducing spot fixed with respect to said recording spot, and for directing and focusing said second reproducing laser light on said recording surface at a second reproducing spot which is movable with respect to said recording spot by a variation of the direction of said second reproducing laser light, and for collecting said first and second reproducing laser light reflected from said recording surface and directing it;
optical sensor means for receiving said reflected first and second reproducing laser light collected and directed by said optical path means;
reproducing means connected to the optical sensor means receiving said reflected first reproducing laser light for reproducing the signal recorded on said recording medium and combination control and reproducing means connected to said optical sensor means for receiving the reflected second reproducing laser light for reproducing the signal recorded on said recording medium and producing a correction signal for actuating said second laser light generating means for varying the direction of said second reproducing laser light for moving said second reproducing spot toward the position of said recording track.

2. An optical signal recording and reproducing device as claimed in claim 1 wherein said second reproducing laser light producing means comprises a reflecting mirror disposed in the optical path of said second reproducing laser light between said reproducing light source means and said second optical path means, said reflecting mirror being controllably rotatable around a rotational axis thereof to vary said direction of said second reproducing laser light for moving said second reproducing spot in a direction perpendicular to said track on said recording surface.

3. An optical signal recording and reproducing device as claimed in claim 2 wherein said reproducing light source means comprises a first reproducing light source for producing said first reproducing laser light and said second reproducing laser light producing means includes a second reproducing light source for producing said second reproducing laser light.

4. An optical signal recording and reproducing device as claimed in claim 2 wherein said reproducing light source means comprises a single light source and said second reproducing laser light producing means receives light from said single light source for producing the second reproducing laser light.

5. An optical signal recording and reproducing device as claimed in claim 4 wherein said second reproducing laser light producing means further comprises:
a half-wave plate removably insertable into the optical path of the reproducing light from said single light source for forming said second reproducing laser light from the light from said single light source;

a polarized beam splitter in the path of said light downstream of the position of said half-wave plate for reflecting the second reproducing laser light; said reflecting mirror being positioned for receiving said second reproducing light reflected by said polarized beam splitter and said first reproducing laser light being the light from said single light source when said half-wave plate is removed from the optical path of said light and passing directly through said beam splitter.

6. An optical signal recording and reproducing device as claimed in claim 5 wherein said second reproducing laser light producing means further comprises:
reflecting means for receiving said second reproducing laser light reflected by said reflecting mirror and directing it toward said second optical path means; and a further half-wave plate removably insertable into the optical path of said second reproducing laser light downstream of said polarized beam splitter.

7. An optical signal recording and reproducing device as claimed in claim 6 in which said further half-wave plate is between said reflecting mirror and said reflecting means.

8. An optical signal recording and reproducing device as claimed in claim 6 in which said further half-wave plate is downstream of said reflecting means.

9. An optical signal recording and reproducing device as claimed in claim 6 in which said reflecting means is a mirror positioned to permit said first reproducing laser light to pass said mirror.

* * * * *